(12) United States Patent
Gualdoni et al.

(10) Patent No.: US 7,287,457 B1
(45) Date of Patent: Oct. 30, 2007

(54) STRUCTURE FOR RETAINING A PISTON ASSEMBLY IN POSITION RELATIVE TO A CYLINDER

(75) Inventors: Glenn R. Gualdoni, Bloomfield, MI (US); Gary King, Hartland, MI (US)

(73) Assignee: Kelsey-Hayes Company, Livonia, MI (US)

( * ) Notice: Subject to any disclaimer, the term of this patent is extended or adjusted under 35 U.S.C. 154(b) by 32 days.

(21) Appl. No.: 11/175,966

(22) Filed: Jul. 6, 2005

(51) Int. Cl.
*F15B 15/26* (2006.01)

(52) U.S. Cl. ............. 92/15; 92/30; 92/128; 60/589
(58) Field of Classification Search ............ 91/15, 91/30, 128, 140; 60/533, 589, 562

See application file for complete search history.

(56) References Cited

FOREIGN PATENT DOCUMENTS

DE         19610834 A1 *  6/1997

* cited by examiner

Primary Examiner—Igor Kershteyn
(74) Attorney, Agent, or Firm—MacMillan, Sobanski & Todd, LLC

(57) ABSTRACT

A fluid actuator and retainer assembly, such as a master cylinder assembly for a vehicular braking system, includes a housing having a groove, a cylinder provided within the housing, and a piston assembly. The piston assembly includes a piston disposed within the cylinder for sliding movement relative thereto and a rod connected to the piston and extending from the cylinder and the housing. A retaining structure includes a rod engagement surface in contact with the rod, a plurality of engagement fingers extending from the rod engagement surface, and a detent extending from each of the plurality of engagement fingers into cooperation with the groove to retain the piston assembly in position relative to the cylinder housing.

18 Claims, 6 Drawing Sheets

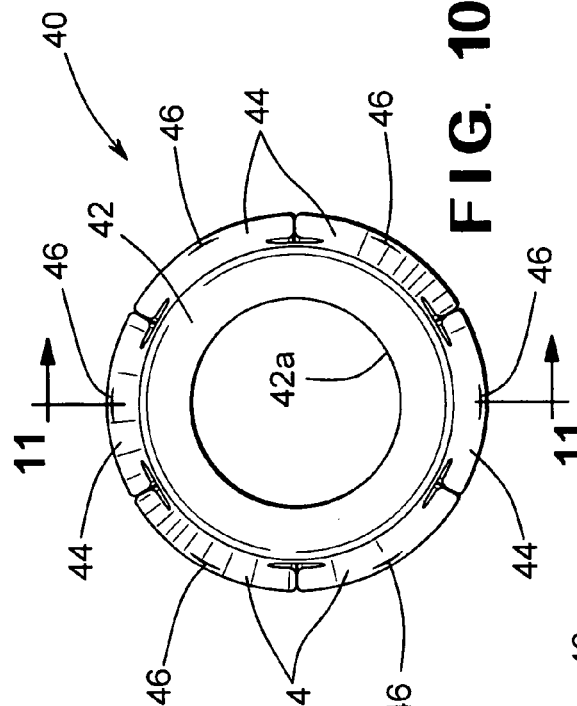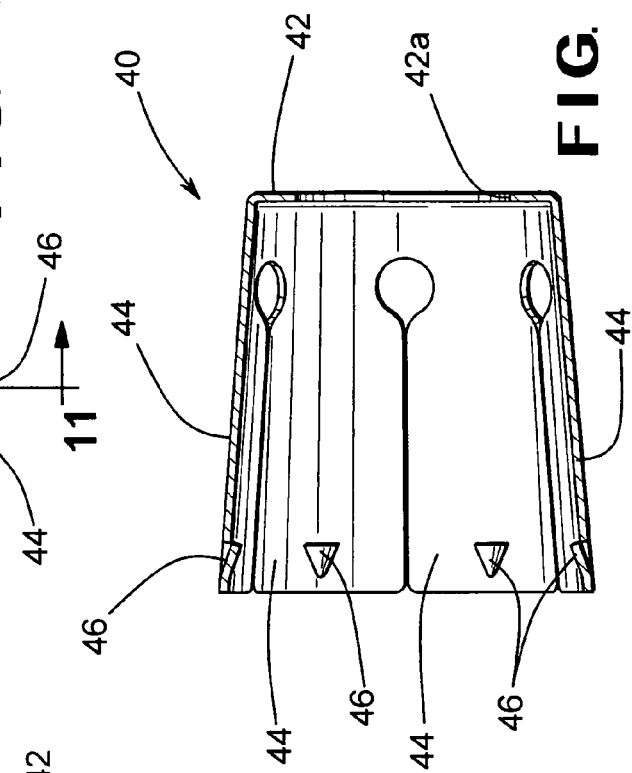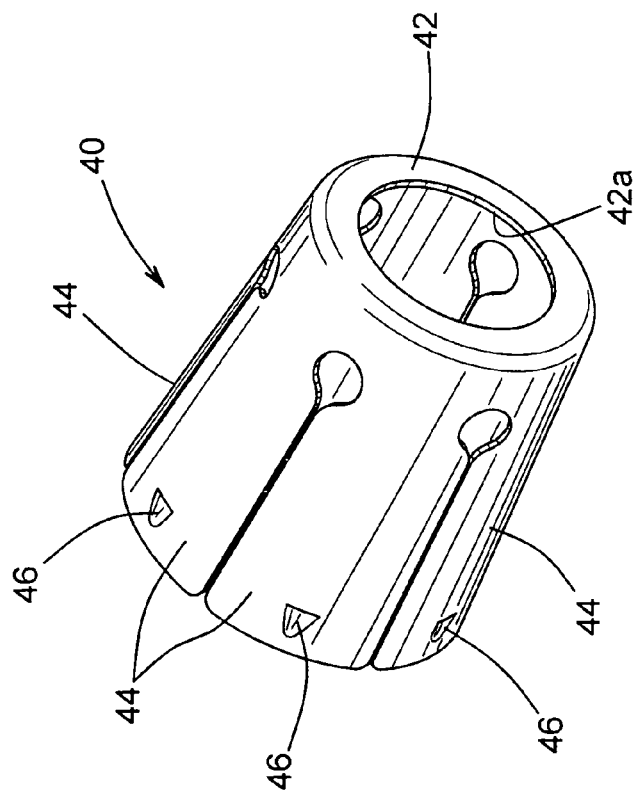

STRUCTURE FOR RETAINING A PISTON ASSEMBLY IN POSITION RELATIVE TO A CYLINDER

BACKGROUND OF THE INVENTION

This invention relates in general to a fluid actuator that includes a hollow cylinder having a piston assembly supported for sliding movement therein. In particular, this invention relates to an improved structure for retaining a piston assembly in position relative to a cylinder, such as during assembly, shipment, or maintenance.

A fluid actuator is a well known device that is responsive to the physical movement of an input member for generating a flow of pressurized fluid to a hydraulically driven output device. A basic fluid actuator includes a hollow cylinder having a piston supported for sliding movement therein. The outer circumferential surface of the piston sealingly engages the inner circumferential surface of the cylinder so as to divide the interior of the cylinder into first and second chambers. A rod is usually connected to the piston for movement therewith so as to define a piston assembly. The rod extends through the first chamber and outwardly from the cylinder so as to function as the input member of the fluid actuator. The second chamber of the cylinder is filled with a hydraulic fluid (typically a relatively incompressible fluid, such as oil or water) and communicates through a fluid conduit with the hydraulically driven output device. When a force is applied to the rod extending from the first chamber, the piston assembly is physically moved relative to the cylinder. As a result, pressurized hydraulic fluid flows through the fluid conduit to the hydraulically driven output device to operate same. Fluid actuators of this general type are commonly used in a variety of applications.

One well known application for such a fluid actuator is in the braking system of a vehicle. In such a vehicular braking system, the rod of the piston assembly is connected (either directly or through a mechanical linkage) to a brake pedal located within the driver compartment of the vehicle, while the hydraulically driven output device communicating with the cylinder is a brake assembly located at the wheel of the vehicle. When a force is applied to the brake pedal by the foot of a driver, the rod and the piston are physically moved relative to the cylinder. As a result, pressurized hydraulic fluid flows through the fluid conduit to the brake assembly to slow or stop rotation of the wheel.

In the manufacture of such vehicular brake assemblies and other types of fluid actuators, it is known to manufacture and assemble the mechanical components of the system in a first location, then transport such mechanical components to a second location for installation on the vehicle. When this is done, it is common for the hydraulic fluid to be provided within the second chamber of the cylinder only after arrival at the second manufacturing location, where the mechanical components of the system are installed on the vehicle. In these instances, it has been found that the piston assembly is able to move somewhat freely relative to the cylinder because both of the first and second chambers of the cylinder are empty during transportation from the first manufacturing location to the second manufacturing location. Such relative movement, if not restrained, can result in undesirable relative movements and impacts between the piston assembly and the cylinder, which can cause damage to the components of the fluid actuator. Similarly, such undesirable relative movement can occur during maintenance of a hydraulic system including the fluid actuator, during which the second chamber of the cylinder is initially drained of hydraulic fluid, then re-filled. Additionally, it is sometimes desirable to retain the piston assembly during installation of a hydraulic brake system. For example, to facilitate the installation process and for safety reasons, it is commonly known to retain the piston assembly relative to the cylinder during the evacuation and fill process of a vehicular braking system during assembly of an automotive vehicle.

In these and other situations, it is known to provide a structure for retaining the piston assembly in position relative to the cylinder to prevent the piston and the rod from moving freely relative to the cylinder. Although known piston assembly retaining mechanisms have been effective, they have been found to be somewhat difficult and time consuming to install and remove. Thus, it would be desirable to provide an improved structure for retaining a piston assembly in position relative to a cylinder that is relatively quick and easy to install and remove.

SUMMARY OF THE INVENTION

This invention relates an improved structure for retaining a piston assembly in position relative to a cylinder that is relatively quick and easy to install and remove. A fluid actuator and retainer assembly, such as a master cylinder assembly for a vehicular braking system, includes a housing having a groove, a cylinder provided within the housing, and a piston assembly. The piston assembly includes a piston disposed within the cylinder for sliding movement relative thereto and a rod connected to the piston and extending from the cylinder and the housing. A retaining structure includes a rod engagement surface in contact with the rod, a plurality of engagement fingers extending from the rod engagement surface, and a detent extending from each of the plurality of engagement fingers into cooperation with the groove to retain the piston assembly in position relative to the cylinder housing.

Various objects and advantages of this invention will become apparent to those skilled in the art from the following detailed description of the preferred embodiments, when read in light of the accompanying drawings.

BRIEF DESCRIPTION OF THE DRAWINGS

FIG. 9 is an enlarged perspective view of a third embodiment of a structure for retaining a piston assembly in position relative to a cylinder in accordance with this invention.

FIG. 10 is an end elevational view of the third embodiment of the retaining structure illustrated in FIG. 9.

FIG. 11 is a sectional elevational view of the third embodiment of the retaining structure taken along line 11-11 of FIG. 10.

DETAILED DESCRIPTION OF THE INVENTION

Figure 1:
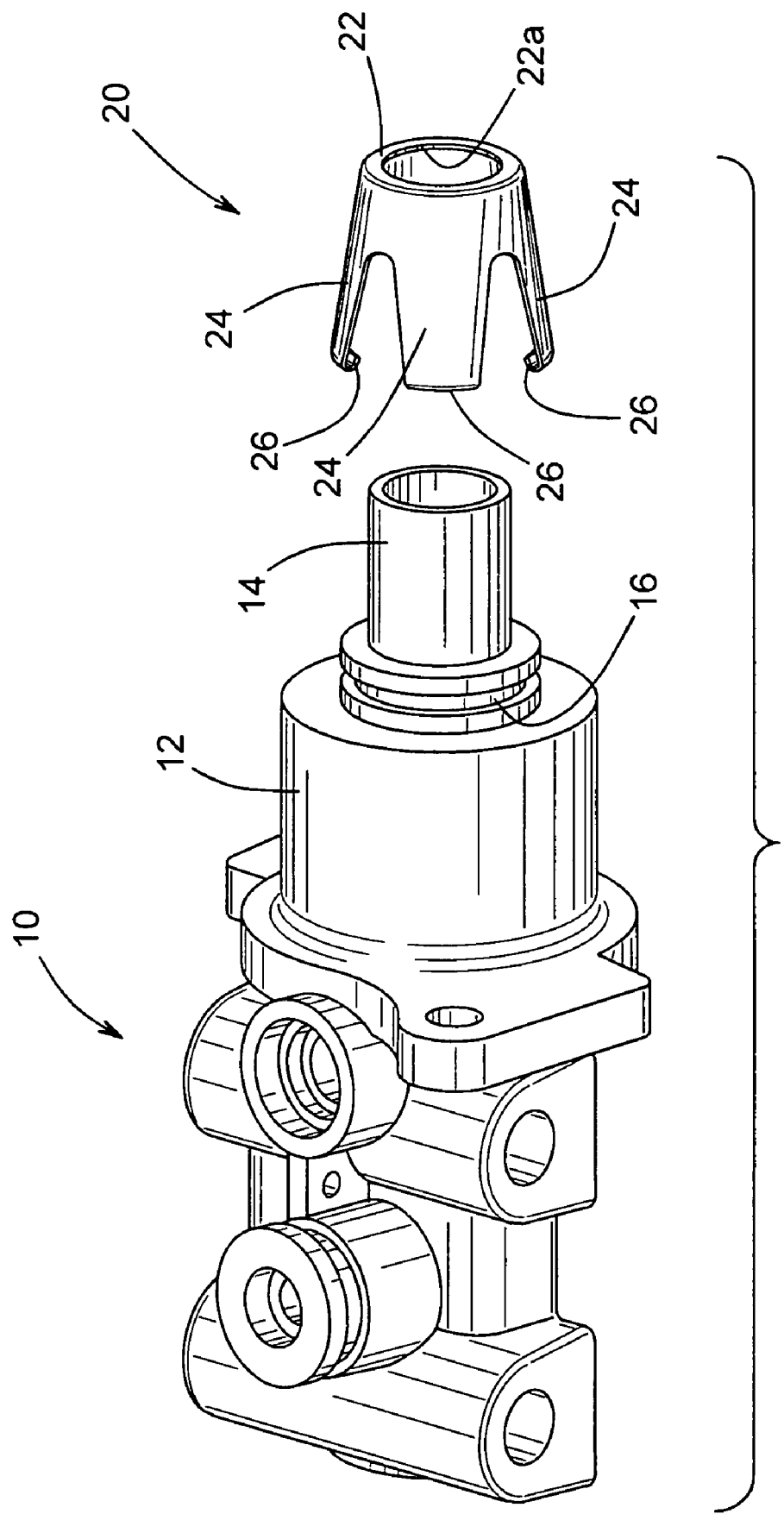
FIG. 1 is an exploded perspective view of a fluid actuator and a first embodiment of a structure for retaining a piston assembly in position relative to a cylinder in accordance with this invention.

Referring now to the drawings, there is illustrated in FIG. 1 a fluid actuator, indicated generally at 10, in accordance with this invention. The illustrated fluid actuator 10 is a master cylinder, such as is commonly used in the hydraulically actuated brake systems of many vehicles. The master cylinder 10 is, of itself, conventional in the art and is intended merely to illustrate one environment in which this invention may be used. Thus, the scope of this invention is not intended to be limited for use with the specific structure for the master cylinder 10 illustrated in FIG. 1 or with hydraulically actuated braking systems in general. On the contrary, as will become apparent below, this invention may be used in any desired environment for the purposes described below.

The illustrated master cylinder 10 is a dual action master cylinder that is suitable to pressurize primary and secondary circuits (not shown) in a dual circuit hydraulic braking system. The structure and operation of the master cylinder 10 and the overall hydraulic braking system in which it is used are disclosed in U.S. Pat. No. 6,012,288, issued Jan. 11, 2000, which is owned by the assignee of this invention. The disclosure of that patent is incorporated herein by reference. Briefly, however, the master cylinder 10 includes a housing 12 that encloses a hollow cylinder (not shown) having a piston (not shown) disposed therein. In a manner that is well known in the art, the outer circumferential surface of the piston slidably and sealingly engages the inner circumferential surface of the cylinder so as to divide the interior of the cylinder into first and second chambers. A rod 14 is connected to the piston for movement therewith so as to define a piston assembly. The rod 14 extends through the first chamber and outwardly from the cylinder and the housing 12. The rod 14 is connected to a brake pedal (not shown), such as is commonly located within a driver compartment of a vehicle. The second chamber of the cylinder is filled with a hydraulic fluid, typically a relatively incompressible fluid, such as oil or water. The second chamber of the cylinder communicates through a fluid conduit with a brake assembly, such as is commonly located at the wheel of the vehicle. Thus, when a force is applied to the brake pedal by the foot of a driver, the piston assembly contained within the housing 12 is physically moved relative to the cylinder. As a result, pressurized hydraulic fluid flows through the fluid conduit to the brake assembly to slow or stop rotation of the wheel. The structure and method of operation of the master cylinder 10 thus far described is conventional in the art.

As mentioned above, there are instances wherein the piston assembly is able to move somewhat freely relative to the cylinder, and such relative movement, if not restrained, can result in undesirable impacts between the piston assembly and the cylinder. To prevent this from occurring, an engagement surface is provided on the housing 12 of the master cylinder 10. In the illustrated embodiment, the engagement surface is embodied as a groove 16 that extends about an opening formed through the housing 12, through which the rod 14 of the piston assembly protrudes. The illustrated groove 16 is formed in an outer surface of the housing 12 and extends completely about the opening, although such is not necessary.

A first embodiment of a structure, indicated generally at 20, is provided for retaining the piston assembly in position relative to the cylinder and the housing 12 in accordance with this invention. The first embodiment of the retaining structure 20 is generally cup-shaped, including a rod engagement surface 22, a plurality of engagement fingers 24 that extend from the engagement surface 22, and a plurality of detents in the form of tangs 26 that are provided on the ends of the engagement fingers 24. In the illustrated embodiment, the rod engagement surface 22 is generally flat and circular in shape, having an opening 22a formed therethrough. However, it will be appreciated that the rod engagement surface 22 may be formed having any desired shape. Each of the illustrated engagement fingers 24 extends at an angle from the rod engagement surface 22 so as to generally define the shape of a truncated frustum. In the illustrated embodiment, four engagement fingers 24 extend from the rod engagement surface 22, although a greater or lesser number of such engagement fingers 24 may be provided. The illustrated tangs 26 extend respectively from the ends of the engagement fingers 24 opposite from the rod engagement surface 22 and curl inwardly into the interior of the retaining structure 20. The tangs 26 are sized and shaped to cooperate with the groove 16 provided in the outer surface of the housing 12 of the master cylinder 10 to releasably retain the retaining structure 20 thereon, as shown in FIG. 2.

In the illustrated embodiment, the retaining structure 20 is formed from a unitary or single piece of material. Preferably, the retaining structure 20 is stamped from a sheet of a metallic material, such as steel or aluminum. Alternatively, the retaining structure 20 may be formed from other nonmetallic materials, such as a resilient polymer, such as polypropylene. Also, some or all of the various portions of the retaining structure 20 (i.e., the rod engagement surface 22, the engagement fingers 24, and the tangs 26) may be formed from separate pieces of material that are joined in a suitable manner, such as by welds, fasteners, adhesives, and the like.

Figure 2:
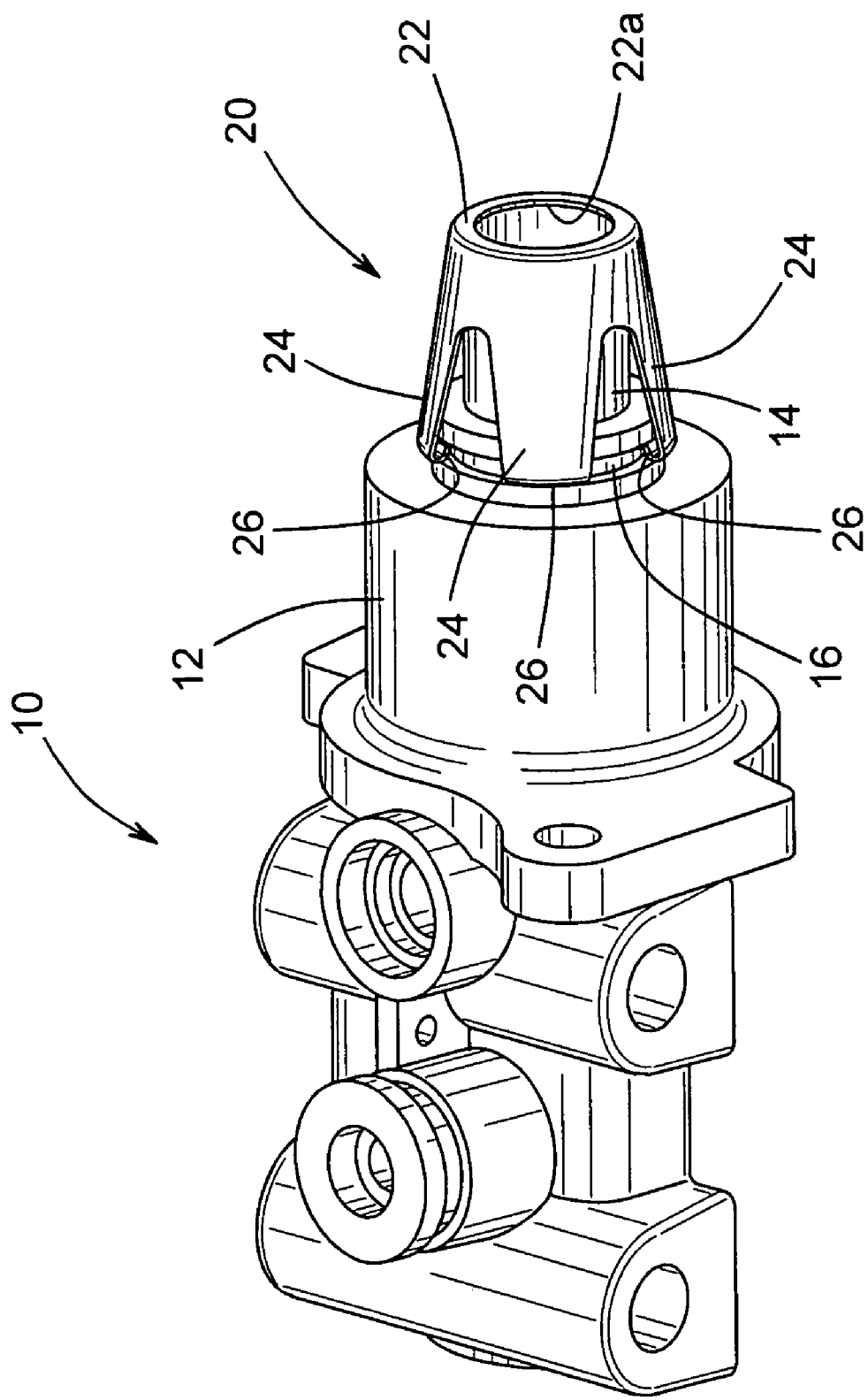
FIG. 2 is a perspective view similar to FIG. 1 showing the first embodiment of the retaining structure illustrated in FIG. 1 installed on the fluid actuator.
Figure 4:
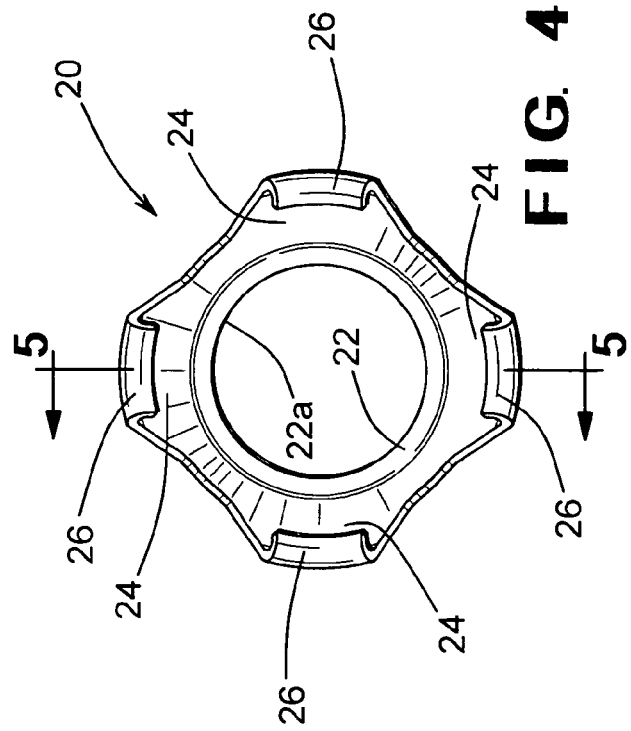
FIG. 4 is an end elevational view of the first embodiment of the retaining structure illustrated in FIG. 3.
Figure 5:
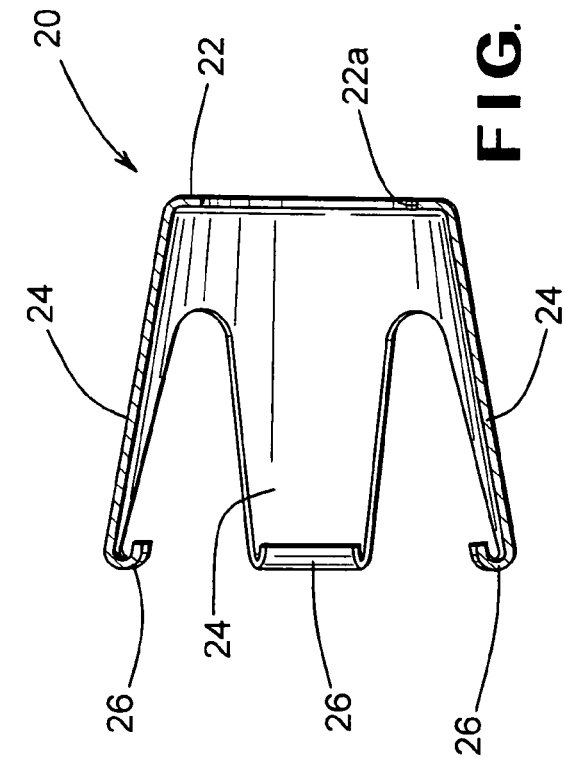
FIG. 5 is a sectional elevational view of the first embodiment of the retaining structure taken along line 5-5 of FIG. 4.
Figure 3:
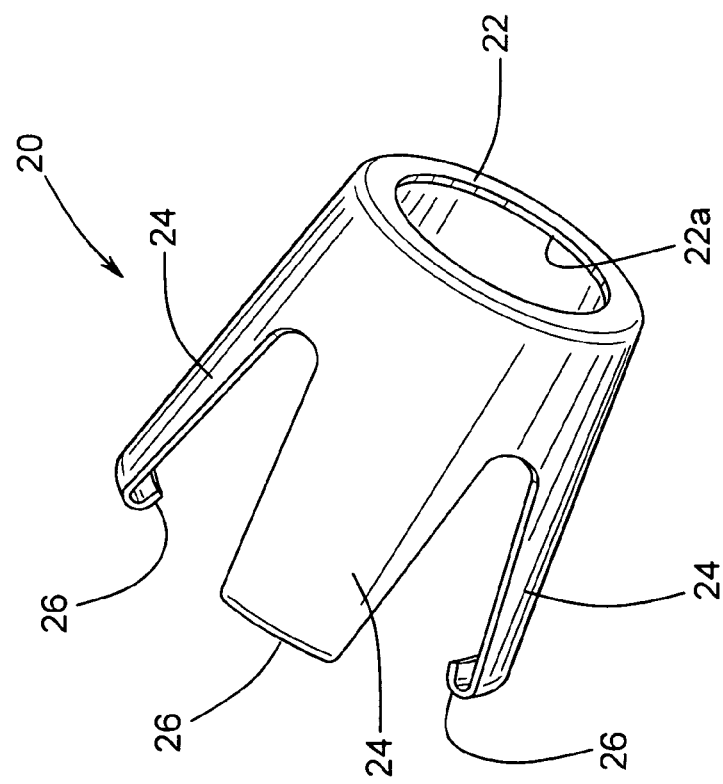
FIG. 3 is an enlarged perspective view of the first embodiment of the retaining structure illustrated in FIGS. 1 and 2.

The retaining structure 20 can be quickly and easily installed on the master cylinder 10 as shown in FIG. 2 by positioning the tangs 26 in cooperation with the groove 16 provided in the housing 12 of the master cylinder 10. To accomplish this, the engagement fingers 24 of the retaining structure 20 can be initially flexed relative to one another, either manually or with the assistance of a tool (not shown). Then, the tangs 26 of the engagement fingers 24 are aligned within the groove 16 provided in the housing 12 of the master cylinder 10. Lastly, the engagement fingers 24 are released, allowing the tangs 26 to spring back into cooperation with the groove 16. The engagement fingers 24 and the tangs 26 of the retaining structure 20 are preferably sized and shaped such that the tangs 26 of the retaining structure 20 are received within the groove 16 in a close fitting relationship. As a result, the retaining structure 20 is reliably secured to the housing 12 of the master cylinder 10.

When so installed, the rod engagement surface 22 engages the outer end of the rod 14 of the piston assembly.

The retaining structure 20 is sized such that when it is installed on the housing 12 of the master cylinder 10, the rod 14 and the remainder of the piston assembly are retained in position relative to the cylinder contained within the housing 12. Additionally, the retaining structure 20 protectively covers the outer surface of the rod 14, as well as the opening formed through housing 12 through which the rod 14 extends.

The retaining structure 20 can also be quickly and easily removed from the master cylinder 10. To accomplish this, the engagement fingers 24 are again flexed inwardly toward one another (either manually or with the assistance of the tool) so that the tangs 26 are moved out of cooperation with the groove 16. Then, the retaining structure 20 can be removed from the housing 12 of the master cylinder 10 and saved for reuse in the future.

Figure 7:
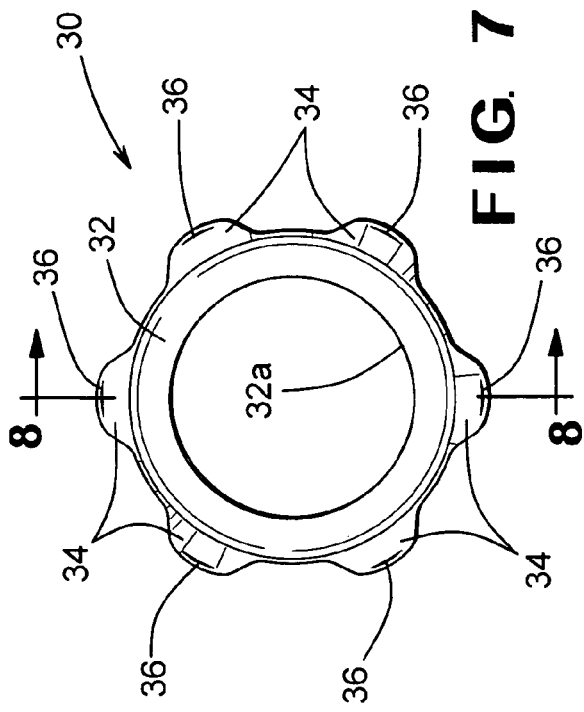
FIG. 7 is an end elevational view of the second embodiment of the retaining structure illustrated in FIG. 6.
Figure 8:
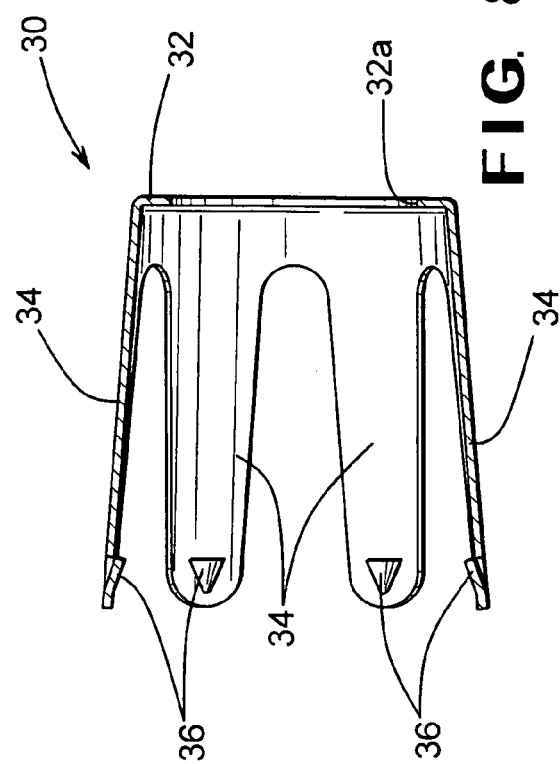
FIG. 8 is a sectional elevational view of the second embodiment of the retaining structure taken along line 8-8 of FIG. 7.
Figure 6:
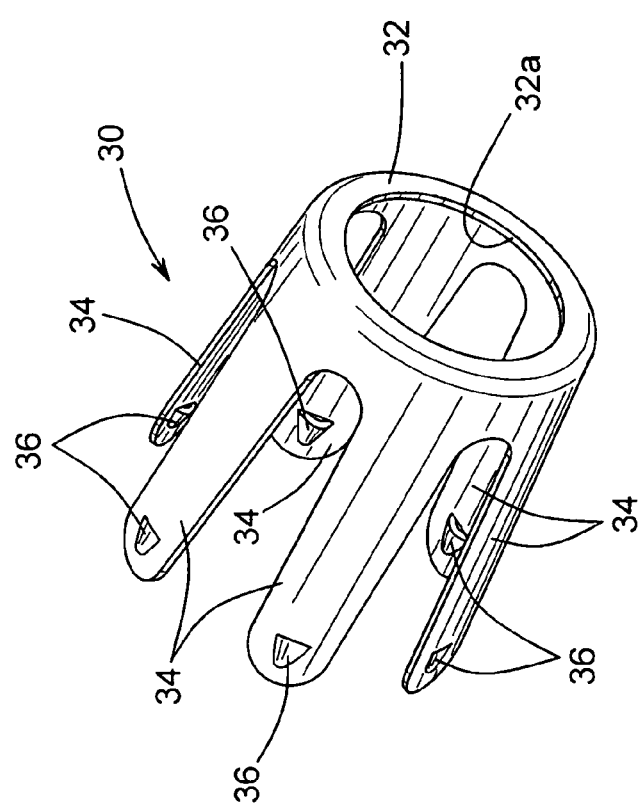
FIG. 6 is an enlarged perspective view of a second embodiment of a structure for retaining a piston assembly in position relative to a cylinder in accordance with this invention.

FIGS. 6, 7, and 8 illustrate a second embodiment of a structure, indicated generally at 30, for retaining the piston assembly in position relative to the cylinder in accordance with this invention. The second embodiment of the retaining structure 30 is generally cup-shaped, including a rod engagement surface 32, a plurality of engagement fingers 34 that extend from the engagement surface 32, and a plurality of detents 36 that are provided on the engagement fingers 34. In the illustrated embodiment, the rod engagement surface 32 is generally flat and circular in shape, having an opening 32a formed therethrough. However, it will be appreciated that the rod engagement surface 32 may be formed having any desired shape. Each of the illustrated engagement fingers 34 extends at an angle from the rod engagement surface 32 so as to generally define the shape of a truncated frustum. In the illustrated embodiment, six engagement fingers 34 extend from the rod engagement surface 32, although a greater or lesser number of such engagement fingers 34 may be provided. The illustrated detents 36 extend respectively from the engagement fingers 34 into the interior of the retaining structure 30. The detents 36 can be formed by cutting and deforming portions of the engagement fingers 34 inwardly into the interior of the retaining structure 30. The detents 36 are sized and shaped to cooperate with the groove 16 provided in the housing 12 of the master cylinder 10 similar to the manner described above to releasably retain the retaining structure 30 thereon. As also described above, the retaining structure 30 can be formed from a unitary or single piece of material. Preferably, the retaining structure 30 is stamped from a sheet of a metallic material, such as steel or aluminum. Alternatively, the retaining structure 30 may be formed from other non-metallic materials, such as a resilient polymer, such as polypropylene. Also, some or all of the various portions of the retaining structure 30 (i.e., the rod engagement surface 32, the engagement fingers 34, and the detents 36) may be formed from separate pieces of material that are joined in a suitable manner, such as by welds, fasteners, adhesives, and the like.

FIGS. 9, 10, and 11 illustrate a third embodiment of a structure, indicated generally at 40, for retaining the piston assembly in position relative to the cylinder in accordance with this invention. The third embodiment of the retaining structure 40 is generally cup-shaped, including a rod engagement surface 42, a plurality of engagement fingers 44 that extend from the engagement surface 42, and a plurality of detents 46 that are provided on the engagement fingers 44. In the illustrated embodiment, the rod engagement surface 42 is generally flat and circular in shape, having an opening 42a formed therethrough. However, it will be appreciated that the rod engagement surface 42 may be formed having any desired shape. Each of the illustrated engagement fingers 44 extends at an angle from the rod engagement surface 42 so as to generally define the shape of a truncated frustum. In the illustrated embodiment, six engagement fingers 44 extend from the rod engagement surface 42, although a greater or lesser number of such engagement fingers 44 may be provided. The illustrated detents 46 extend respectively from the engagement fingers 44 into the interior of the retaining structure 40. The detents 46 can be formed by cutting and deforming portions of the engagement fingers 44 inwardly into the interior of the retaining structure 40. The detents 46 are sized and shaped to cooperate with the groove 16 provided in the housing 12 of the master cylinder 10 similar to the manner described above to releasably retain the retaining structure 40 thereon. As also described above, the retaining structure 40 can be formed from a unitary or single piece of material. Preferably, the retaining structure 40 is stamped from a sheet of a metallic material, such as steel or aluminum. Alternatively, the retaining structure 40 may be formed from other non-metallic materials, such as a resilient polymer, such as polypropylene. Also, some or all of the various portions of the retaining structure 40 (i.e., the rod engagement surface 42, the engagement fingers 44, and the detents 46) may be formed from separate pieces of material that are joined in a suitable manner, such as by welds, fasteners, adhesives, and the like.

Figure 12:
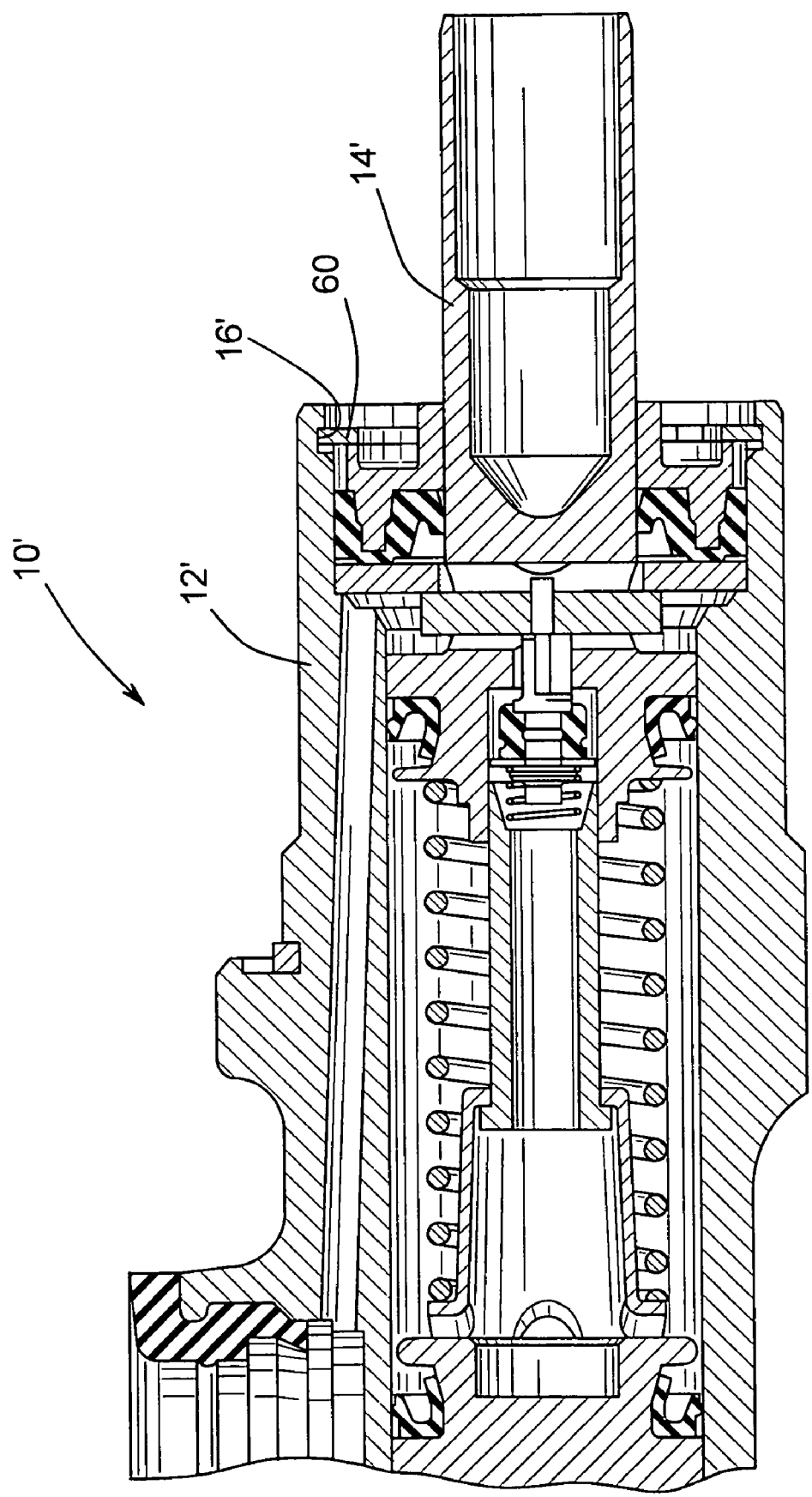
FIG. 12 is a sectional elevational view of a master cylinder assembly for a vehicular braking system and a prior art version of a structure for retaining a piston assembly in position relative to a cylinder.

FIG. 12 illustrates a master cylinder assembly 10' that is similar to the master cylinder assembly 10 illustrated in FIGS. 1 and 2. The master cylinder 10' is shown together with a prior art version of a retaining structure that is known in the art. The master cylinder 10' includes a housing 12', a rod 14, and an annular groove 16', similarly as described above, except that the annular groove 16' is formed about the housing 12' such that the groove 16' faces the rod 14'. A prior art retaining structure 60 is disposed within the groove 16' and engages the outer surface of a portion of the rod 14'. As a result, the rod 14' and the remainder of the piston assembly are retained in position relative to the cylinder contained within the housing 12'. The prior art retaining structure 60 is essentially a C-shaped snap ring that can be installed within the groove 16' by initially compressing the ends thereof together, then sliding it along the rod 14' until it is disposed adjacent to the groove 14'. Then, the ends of the prior art retaining structure 60 are released, allowing them to expand into the groove 16'.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A fluid actuator and retainer assembly comprising:
   a housing having a groove;
   a cylinder provided within said housing;
   a piston assembly including a piston disposed within said cylinder for sliding movement relative thereto and a rod connected to said piston and extending from said cylinder and said housing, said rod having an end surface; and
   a retaining structure including a rod engagement surface in contact with said end surface of said rod, a plurality of engagement fingers extending from said rod engagement surface, and a detent extending from each of said engagement fingers into cooperation with said groove to retain said piston assembly in position relative to said cylinder housing.

2. The fluid actuator and retainer assembly defined in claim 1 wherein said rod engagement surface has an opening formed therethrough.

3. The fluid actuator and retainer assembly defined in claim 1 wherein a plurality of engagement fingers generally define the shape of a truncated frustum.

4. The fluid actuator and retainer assembly defined in claim 1 wherein said detents extend respectively from said engagement fingers into an interior of said retaining structure.

5. The fluid actuator and retainer assembly defined in claim 4 wherein said detents extend respectively from said engagement fingers and curl inwardly into said interior of said retaining structure.

6. The fluid actuator and retainer assembly defined in claim 1 wherein said retaining structure is formed from a single piece of material.

7. A fluid actuator and retainer assembly comprising:
a housing having a groove;
a cylinder provided within said housing;
a piston assembly including a piston disposed within said cylinder for sliding movement relative thereto and a rod connected to said piston and extending from said cylinder and said housing, said rod having an end surface; and
a retaining structure including a rod engagement surface in contact with said end surface of said rod, a plurality of engagement fingers extending from said rod engagement surface, and a detent extending from each of said engagement fingers into cooperation with said groove, said retaining structure retaining said piston assembly in position relative to said cylinder housing.

8. The fluid actuator and retainer assembly defined in claim 7 wherein said rod engagement surface has an opening formed therethrough.

9. The fluid actuator and retainer assembly defined in claim 7 wherein a plurality of engagement fingers generally define the shape of a truncated frustum.

10. The fluid actuator and retainer assembly defined in claim 7 wherein said detents extend respectively from said engagement fingers into an interior of said retaining structure.

11. The fluid actuator and retainer assembly defined in claim 10 wherein said detents extend respectively from said engagement fingers and curl inwardly into said interior of said retaining structure.

12. The fluid actuator and retainer assembly defined in claim 7 wherein said retaining structure is formed from a single piece of material.

13. A fluid actuator and retainer assembly comprising:
a housing having a groove;
a cylinder provided within said housing;
a piston assembly including a piston disposed within said cylinder for axial movement relative thereto and a rod connected to said piston and extending from said cylinder and said housing, said rod having an end surface; and
a retaining structure including a rod engagement surface in contact with said end surface of said rod, a plurality of engagement fingers extending from said rod engagement surface, and a detent extending from each of said engagement fingers into cooperation with said groove, said retaining structure retaining said piston assembly in position axially relative to said cylinder housing.

14. The fluid actuator and retainer assembly defined in claim 13 wherein said rod engagement surface has an opening formed therethrough.

15. The fluid actuator and retainer assembly defined in claim 13 wherein a plurality of engagement fingers generally define the shape of a truncated frustum.

16. The fluid actuator and retainer assembly defined in claim 13 wherein said detents extend respectively from said engagement fingers into an interior of said retaining structure.

17. The fluid actuator and retainer assembly defined in claim 16 wherein said detents extend respectively from said engagement fingers and curl inwardly into said interior of said retaining structure.

18. The fluid actuator and retainer assembly defined in claim 13 wherein said retaining structure is formed from a single piece of material.

* * * * *